United States Patent [19]

Nelson

[11] 4,121,694
[45] Oct. 24, 1978

[54] LABYRINTH LUBRICANT SEAL FOR BELT CONVEYOR ROLL

[75] Inventor: Robert C. Nelson, Bluefield, W. Va.

[73] Assignee: New River Manufacturing Company, Inc., Glen Lyn, Va.

[21] Appl. No.: 625,917

[22] Filed: Oct. 28, 1975

[51] Int. Cl.$^2$ ............................................. F16N 17/06
[52] U.S. Cl. ....................................................... 184/6
[58] Field of Search ............................. 308/187, 187.1; 198/192 R, 192 A; 193/37; 277/53, 56, 57, 133; 184/6, 7 R, 105 R; 29/116

[56] References Cited

U.S. PATENT DOCUMENTS

| | | | |
|---|---|---|---|
| 2,234,574 | 3/1941 | Olcott | 277/57 |
| 2,641,515 | 6/1953 | Bankauf | 277/56 |
| 3,338,381 | 8/1967 | Imse | 198/192 R |
| 3,841,721 | 10/1974 | Coutant | 193/37 |
| 3,892,306 | 7/1975 | Bertaud | 198/192 R |
| 3,927,890 | 12/1975 | Adams | 277/53 |

Primary Examiner—Samuel Feinberg
Attorney, Agent, or Firm—McCaleb, Lucas & Brugman

[57] ABSTRACT

The embodiment of the invention disclosed is a conveyor roll having a cylindrical shell with integral end caps and axial sleeves extending inwardly from the end caps. The shell, end caps and sleeves are rotatably journalled about the shaft by roller bearings between the sleeves and the shaft. An internal labyrinth is provided in each sleeve between the bearing and the end of the shell, this internal labyrinth including a rotatable collar and a non-rotatable bushing carried respectively by the shell and shaft and having a series of facing cylindrical and annular surfaces providing a labyrinthine passageway of restricted cross-section extending from the bearing means to an annular outlet at the end of the shell. An external labyrinth is provided outside the end cap. This includes first and second annular flanges carried respectively by the shaft and shell and axially spaced from the annular outlet and from one another. These two flanges provide inner and outer radial passages. The outer radial passage has radial and axial dimension exceeding those of the inner radial passage whereby centrifugal force acting on a radial column of lubricant in the outer radial passage opposes leakage from the shell.

6 Claims, 6 Drawing Figures

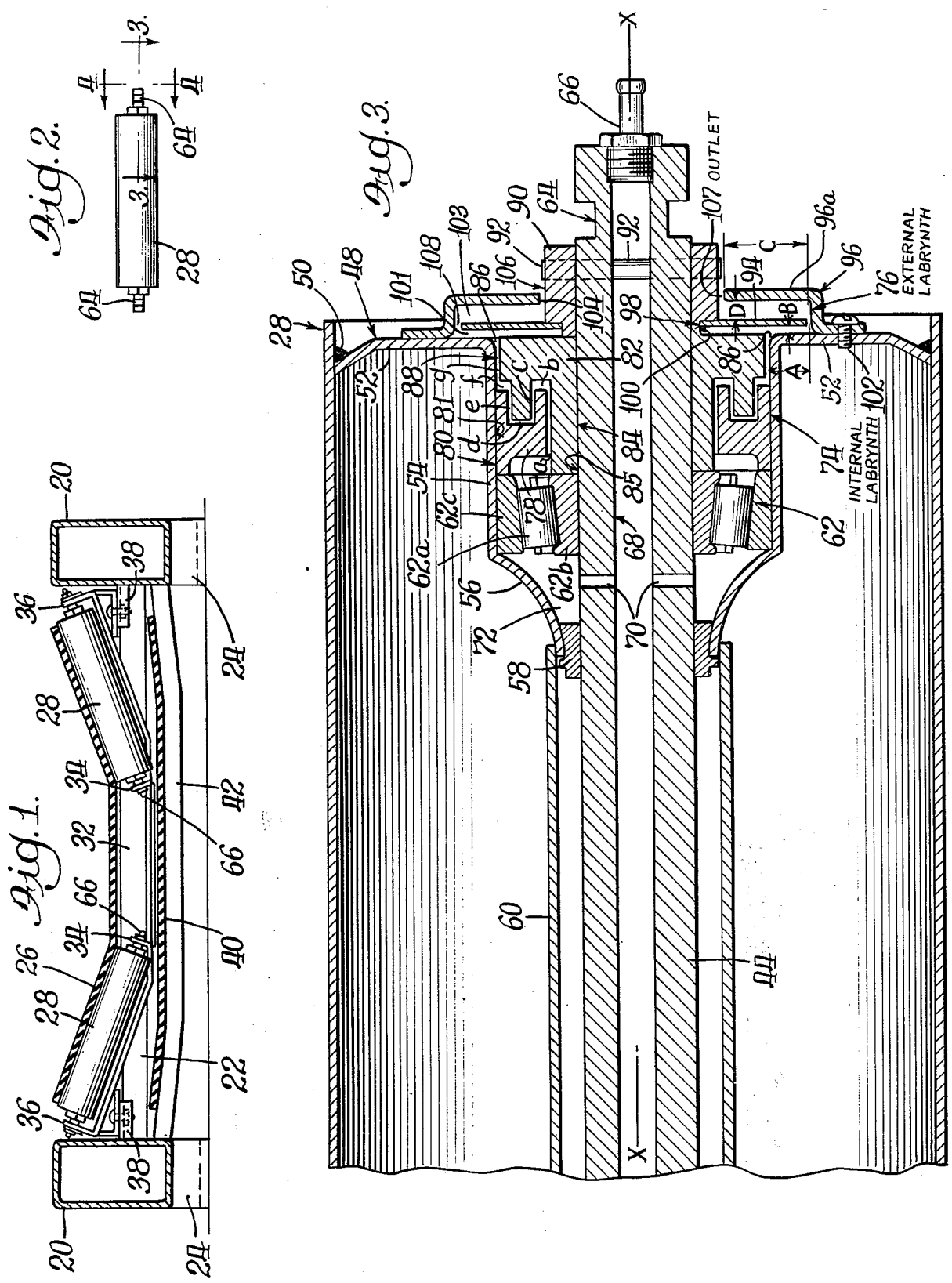

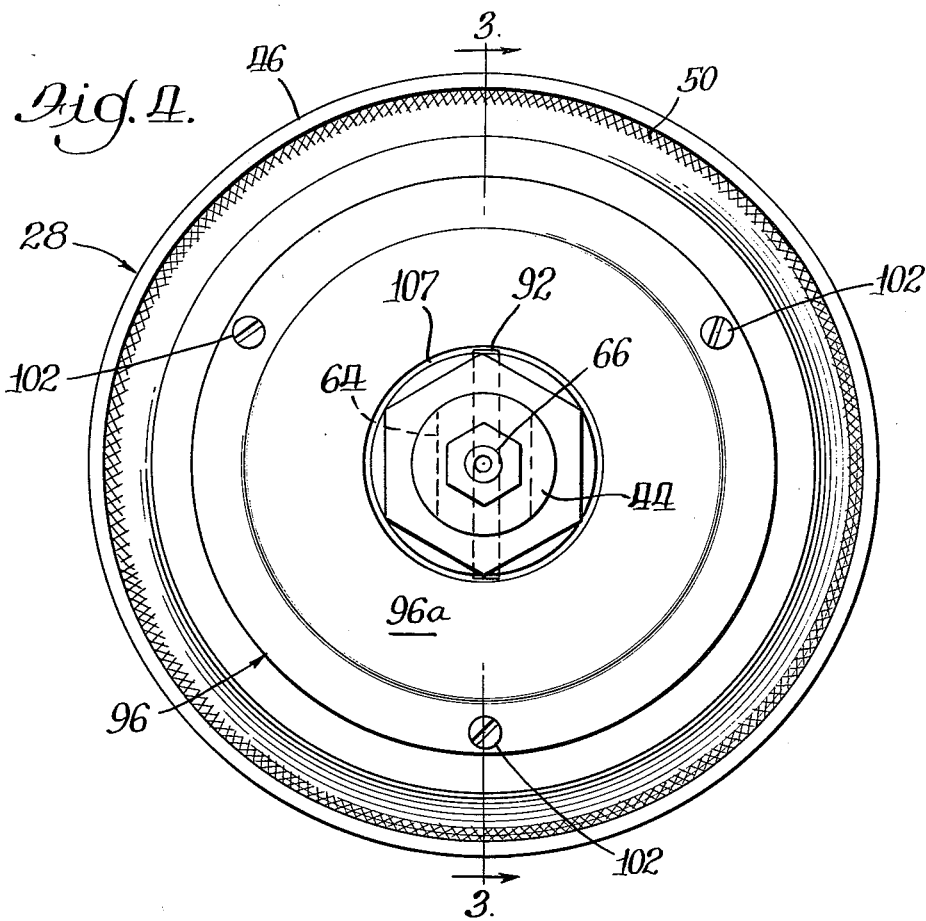
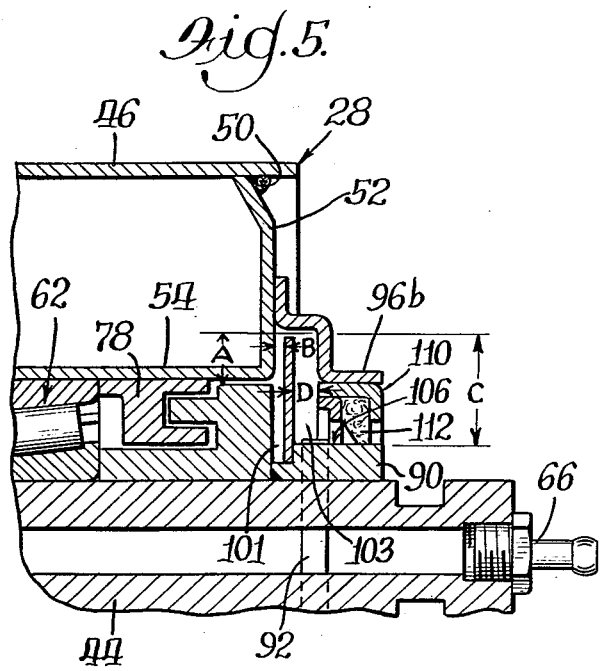
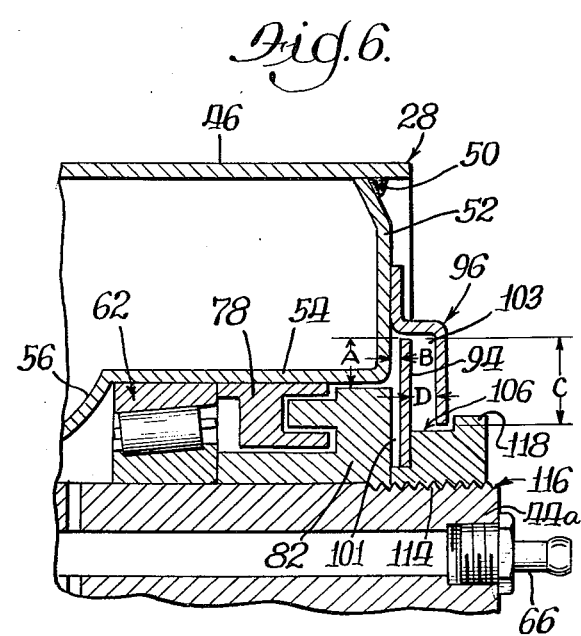

LABYRINTH LUBRICANT SEAL FOR BELT CONVEYOR ROLL

BACKGROUND OF THE INVENTION

The invention belongs to the field of belt conveyors, and more specifically to belt conveyor rolls of the kind classified in U.S. Patent and Trademark Office Classification No. 198.

Conveyor rolls used in heavy industrial conveyors and in underground mining are lubricated infrequently and must operate for long periods of time with their own self-contained reservoir of grease and this must not be prematurely lost by leakage or centrifugal action.

These rolls are generally provided with grease fittings and they have a through passage of some kind from the grease fitting, through the bearing, and back to the outside so that during lubrication there is a visual indication that the bearing is filled.

In conventional rolls, it has been customary to have two kinds of seals, first, a labyrinthine arrangement of some kind which relies on a tortuous passageway to keep the lubricant in place; and second, because the labyrinth arrangements have not been completely effective, a rubber-like seal.

The rubber-like seals have two disadvantages. First, they are expensive. Second, they introduce frictional drag, often as much as one to four ounces hold-back at each roll surface. Where one troughing assembly uses three rolls and there is a troughing assembly every four to five feet for hundreds of feet, this creates a substantial overall drag and requires high horsepower inputs just to move the belt empty.

Preferably, a conveyor roll would be cheaper and better if these conventional rubber-like seals were eliminated.

SUMMARY OF THE INVENTION

It is a general object of the present invention to provide an improved labyrinth seal for a conveyor roll which would eliminate the need for additional rubber-like seals, and thereby enable the belt conveyor to operate without loss of lubricant from the bearings, and with a minimum of hold back drag.

An object of the invention is to provide a conveyor roll having an improved labyrinth seal through which lubricant will readily flow and issue on the outlet side of the bearing to verify that it has been lubricated, yet which will effectively utilize centrifugal force to positively retain lubricant during operation.

Another object is to provide an improved labyrinthine seal terminating in a radially inwardly directed outer radial passage normal to the rotation axis of the shell, that passage having sufficient length measured radially of the axis, and width measured parallel to that axis, to employ centrifugal force effectively in keeping lubricant within the roll.

A specific feature of the invention is to provide such an improved labyrinth seal in which there are internal and external labyrinth seals in series relationship, the internal labyrinth seal terminating in an annular outlet at the end of the shell, and the external seal including an annular flange rotatable with the shell and axially spaced from the annular outlet and extending radially inwardly to a free inner edge having a radius less than that of the annular outlet to hold lubricant within the labyrinth seals by centrifugal action.

Other objects and advantages will be apparent from the following description taken in connection with the accompanying drawings in which:

BRIEF DESCRIPTION OF THE DRAWINGS

FIG. 1 is a cross section of a belt conveyor with a troughing roll assembly including three individual rolls employing the present invention;

FIG. 2 is one of the individual rolls removed from the assembly of FIG. 1;

FIG. 3 is a cross section of FIGS. 2 and 4 taken along the line 3—3 in each case;

FIG. 4 is an end view of FIGS. 2 and 3 taken in the direction of arrows 4—4 in each case;

FIG. 5 is a portion of a view similar to FIG. 3 of a modified form of the invention; and FIG. 6 is a view similar to FIG. 5 of another modified form of the invention.

Like parts are referred to by like reference characters.

DESCRIPTION OF THE PREFERRED EMBODIMENT

FIG. 1 illustrates one specific application of conveyor rolls employing the present invention, in an underground mining conveyor. For details, reference should be had to applicant's prior U.S. Pat. No. 3,762,532 issued Oct. 2, 1973. Briefly, it comprises a pair of side rails 20 interconnected at intervals by transverse struts 22 and supported on ground-engaging skids 24. The conveying reach 26 of a conveying belt is supported in a trough-shaped configuration by a pair of inclined troughing rolls 28, 28, and a center roll 30. The troughing rolls, in turn, are supported on the inclined end section of an inverted T-bar 144 by ears 34 and 36. The center roll 30 is similarly supported on ears (not shown) on the backside of the center portion of the T-bar 32. Brackets 38 fasten the opposite ends of the troughing roll assembly to the side rails 20. The return reach 40 of the conveyor belt is supported on downwardly bowed struts 42 supported between the side rails 20. One of the troughing rolls 28 is separated out from the assembly and shown individually in FIG. 2. The invention will now be described for one section and one end view of that roll, as shown in FIGS. 3 and 4, and for the two slightly modified forms shown in FIGS. 5 and 6.

Refer first to the embodiment shown in FIGS. 1, 2, 3 and 4.

It will be understood that all three rolls 28, 28 and 30 are identical, and both ends of each roll are identical.

Conveyor roll 28 has a shaft 44 and a cylindrical shell 46 concentric with the shaft. At each end, the shell has an end cap 48 made integral with it by welding as at 50. The end cap has an outer annular plate section 52 normal to the axis of the assembly and an inner sleeve section 54 with a tapered terminal section 56. If desired, an internal grease retainer 58 of rubber-like material may be used. A grease tube 60 may connect the two tapered terminal sections 56 at the opposite ends of the roll. It will be understood that the grease retainers 58 and grease tube 60 are optional. They have no direct bearing on the present invention.

At the inner end of the inner sleeve section 54, anti-friction bearing means consisting of a roller bearing 62 with rollers 62a and inner and outer rolls 62b and 62c is provided to rotatably journal the shell 46 on the shaft 44.

Each end of the shaft is provided with a pair of parallel flats 64 to facilitate assembly by dropping them into upwardly open slots (not shown) in ears 34 and 36. A grease fitting 66 is threadedly engaged with one or both ends of the shaft. Grease supplied through either grease fitting will enter the throughbore 68 and pass through transverse openings 70 into the grease reservoir 72 on the inlet side of the bearing. Continued application of grease will cause the reservoirs at opposite ends of the shaft to be filled.

Directing attention now to the novel labyrinth seal arrangement, there is an internal labyrinth arrangement generally designated 74 and an external labyrinth arrangement generally designated 76. These will now be described.

As to the internal arrangement, this is within the sleeve section 54 on the outlet side of the roller bearing. This consists of a bushing 78 with an outer cylindrical surface 80 in frictional engagement with the inner surface 81 of the sleeve section 54, and therefore rotatable with the shell; and a collar 82 with an inner bore 84 in frictional contact with the outer surface 85 of the shaft and therefore non-rotatably mounted on it.

The bushing 78 and the collar 82 are formed with mating cylindrical and annular surfaces in close but spaced relation to provide a labyrinthine passage through a series of individual clearance paths indicated a-b-c-d-e-f in FIG. 3. These clearances are large enough to enable a grease gun to force grease through them but small enough to hold grease against leakage by a combination of effects resulting from wetting of the closely adjacent mating surfaces, and surface tension of the grease used. This first, internal labyrinth arrangement 74 allows grease, when applied by a grease gun to the fitting 66, to flow through the bearing to the annular outlet 86 which is provided by the small, cylindrical clearance path g between the outer cylindrical wall 88 of the collar 82, and the inner cylindrical surface 81 of sleeve section 54. The clearance path g terminates at an annular outlet 86. From there, grease under grease gun pressure will enter the external labyrinth arrangement 76 now to be described.

In assembling the roller bearing and labyrinth seal components, an adjusting nut or collar 90 is pressed onto the outer end of the shaft 44 and will be locked in place by means of a pin 92. The nut and shaft are shown here with a press fit. Alternatively, they may be screw-threaded together.

The external labyrinth arrangement 76 includes overlapping annular flanges 94 and 96.

Annular flange 94 has an inner margin 98 press-fitted or otherwise securely fastened on the inner cylindrical end surface 100 of the adjusting nut 90. The annular flange 94, therefore, is stationary and extends radially outwardly past the annular outlet 86 a distance A. Further, it is axially spaced, that is in the direction of the axis of the roll, a distance B from the end cap annular portion 52 to define an inner radial passage 101.

The second annular flange 96 extends radially inwardly from the end cap section 52, inwardly beyond the radius of the outlet 86 being fastened to the end cap by a series of screws 102. As shown in FIG. 3, it has an outer annular portion 96a which extends radially inwardly in a distance C having an inner margin 104 terminating short of the cylindrical surface 106 on the adjusting nut 90 to provide an annular outlet 107. Further, this rotatable outer annular flange 96 is axially spaced a distance D from the stationary flange 94 to define an outer radial passage 103. Suitable space 108 is provided around the free outer periphery of annular flange 94 to interconnect the inner radial passage 101 with the outer radial passage 103.

An important feature of the invention is that the outer radial passage 103 is substantially longer than the inner radial passage 101, as measured radially of the shaft axis X—X; that is, C is greater than A. Thus, once grease fills the outer radial passage 103, rotation of the shell creates a higher centrifugal force tending to keep grease in 103 than to sling it out of 101.

Another important feature is that the outer radial passage 103 is substantially longer than the inner radial passage 101, as measured parallel to the shaft axis X—X; that is, D is greater than B. Test results so far indicate D should be about twice B. Specifically, commercial prototype rolls are currently being made with D = ⅛ inch and B = 1/16 inch.

It will be understood that the reasons given above for the improved performance of rolls made in accordance with the present invention is the best information available at this time, and some of these reasons may be replaced by others as more information is developed. However, the fact is that rolls made as described above, without any kind of supplemental rubber-like grease seal, have operated in commercial size rolls for extended periods without loss of any lubricant whatsoever, either by high speed rotational tests, or stationary tests when the equipment has been shut down for extended weekends in the hot sun when the temperature of the equipment has exceeded 100° F. for hours at a time.

It is believed that the use of the internal labyrinth arrangement 74, in series with the external labyrinth arrangement 76 is beneficial because the external arrangement prevents loss of lubricant by centrifugal force in the way described above, and the closely fitting labyrinth paths a–f retain the lubricant as a result of the grease surface tension on the close wetted surfaces.

From the foregoing, it is believed that use and operation of the improved roll will be obvious. Briefly, however, grease or other lubricant will be applied by a gun to the fitting 66 and pressure continued until grease passes past the pin 92 through the openings 70, bearing 62, and labyrinths 74 and 76, and appears at the outlet 107 around the periphery of the adjusting collar 90. This verifies that the bearing has grease. Then, when the roller is rotated rapidly in service, the centrifugal force in the relatively large outer radial passage 103 offsets any tendency to fling grease out, thereby keeping it inside the roll during rotation. And when the equipment is shut down and stored even in heated ambient conditions, the close proximity of the surfaces in the internal labyrinth 74 prevents the grease from leaking out.

The embodiment in FIG. 5 is identical to that of FIGS. 1-4, except that the second annular flange 96 has been replaced by a flange 96a to hold an external felt wiper seal 110 for specialized applications where the roll may be used in external atmospheres containing severely abrasive dusts such as glass powder or alumina. Here, the flange 96a has a cylindrical end sleeve 96b within which the seal 96a may be press-fitted. It has an internal felt lip 112 in wiping engagement with the cylindrical outer surface 106 on the rotating collar 90.

The embodiment in FIG. 6 is identical to that in FIGS. 1-4, except that the push-on nut or collar 90 held in place by pin 92, is replaced by a nut 90a screw-threaded on the shaft, to conform with conventions for above-ground, industrial applications. The nut 90a has internal threads 114 engaged with threads 116 on each end of a shaft 44a which is identical to shaft 44 except that it eliminates the outer portions with the flats 64. The nut 90a has an outer hex portion 118 which may be gripped by a wrench to assemble or disassemble the roll, and a pair of opposite flats on this hex portion may be used instead of flats 64 to hold the roll in suitable cradle or frame.

While one form and two slight variations in which the present invention may be embodied have been shown and described, it will be understood that various modifications and variations thereof may be effected without departing from the spirit and scope of the invention as defined by the appended claims.

The embodiments of the invention in which an exclusive property or privilege is claimed are defined as follows:

1. In a conveyor roll having a shaft, a cylindrical shell concentric with the shaft and having at each end an end cap closing the shell, with anti-friction bearing means at each end supporting the shell and end caps for rotation about the shaft, an improved labyrinth seal comprising:

an internal labyrinth and an external labyrinth at each end of said shaft;

each said internal labyrinth including a rotatable bushing carried by said sheel axially outwardly of the corresponding bearing means and a non-rotatable collar carried by said shaft, said bushing and collar having a series of facing cylindrical and annular surfaces providing a labyrinthine passageway of restricted cross-section extending from the bearing means to an annular outlet at the end of the shell;

each said external labyrinth including a first radially extending annular flange having a central opening, the wall of said opening being secured about the shaft, the flange being spaced axially outwardly of said cap a predetermined distance, a second annular flange having a first outer marginal edge portion secured to the cap, a second portion overlying but spaced from the outer edge of the first annular flange and a third portion extending from the second portion in a direction parallel to said first annular flange and spaced axially outwardly thereof by a distance greater than said predetermined distance;

said first annular flange overlying the end cap and having its free outer edge extending radially outwardly beyond the wall of said annular outlet and spaced axially therefrom to provide an inner radial passage normal to the rotational axis of the shell;

said second annular flange having its free inner edge extending radially inwardly beyond the wall of said annular outlet to provide an outer radial passage normal to the rotational axis of the shell;

said inner and outer radial passages being interconnected around the free outer edge of said first annular flange;

whereby said outer radial passage has a longer lubricant containing dimension than said inner radial passage, measured radially from the shell axis, and whereby further centrifugal force tending to retain lubricant in said other radial passage counteracts centrifugal force tending to move lubricant outwardly in said inner radial passage.

2. In a conveyor roll, the improvement of claim 1 in which said shell has a concentric inner sleeve at each end and said annular outlet for said internal labyrinth is provided by facing cylindrical surfaces on said sleeve and said collar respectively.

3. In a conveyor roll, the improvement of claim 1 in which said outer radial passage is wider measured parallel to the axis of said shaft and shell than said inner radial passage.

4. In a conveyor roll, the improvement of claim 1 in which said outer radial passage is approximately twice the width measured parallel to the axis of said shaft and shell of said inner radial passage.

5. In a conveyor roll, the improvement of claim 4 in which said outer radial passage is approximately ⅛ inch wide and said inner radial passage is approximately 1/16 inch wide both measured parallel to the axis of said shaft and shell.

6. In a conveyor roll, the improvement of claim 2 in which said bushing and collar are located in the sleeve between the bearing means and the annular outlet.

* * * * *

UNITED STATES PATENT OFFICE
CERTIFICATE OF CORRECTION

Patent No. 4,121,694          Dated October 24, 1978

Inventor(s) Robert C. Nelson

It is certified that error appears in the above-identified patent and that said Letters Patent are hereby corrected as shown below:

Col. 5; line 28 - "sheel" should be -- shell --

Col. 6; line 20 - "other" should be -- outer --

Signed and Sealed this

Sixth Day of February 1979

[SEAL]

Attest:

RUTH C. MASON
Attesting Officer

DONALD W. BANNER
Commissioner of Patents and Trademarks